Figure 1:
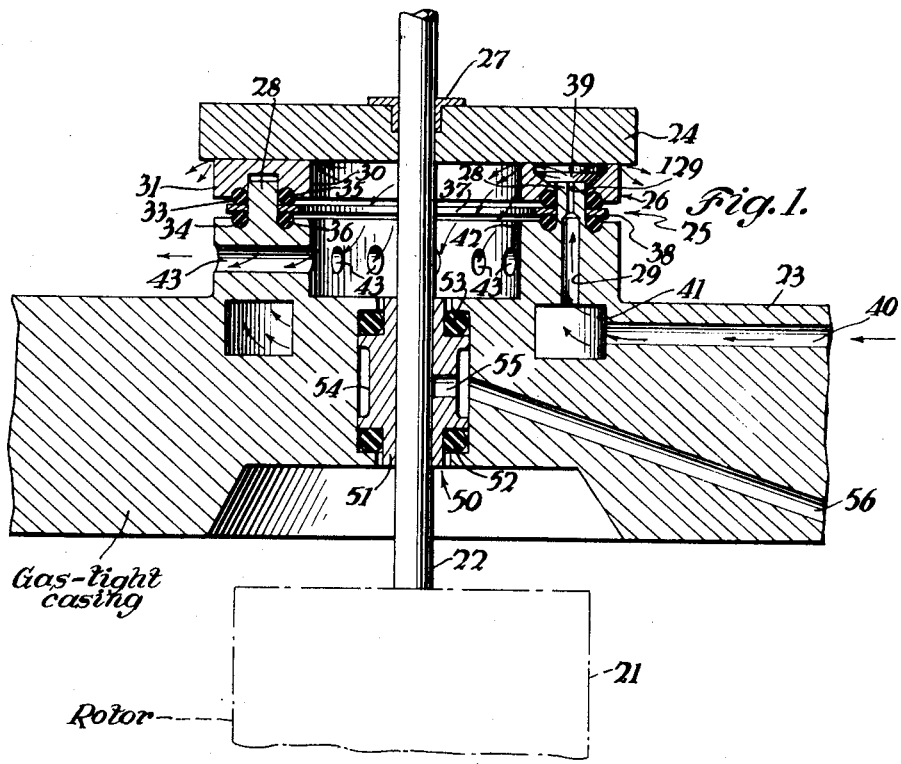

INVENTOR.
Charles W. Skarstrom.

United States Patent Office 2,951,729
Patented Sept. 6, 1960

2,951,729
GAS BEARING

Charles W. Skarstrom, Pearl River, N.Y., assignor to the United States of America as represented by the United States Atomic Energy Commission Filed Mar. 23, 1944, Ser. No. 527,736

13 Claims. (Cl. 308—9)

This invention relates to bearings and more particularly to a gas bearing for high speed shafts such as the shaft of an ultra-centrifuge.

In the art of high speed centrifuging, sometimes called ultra-centrifuging, it is frequently desirable to spin a centrifuge rotor at a speed in excess of 1000 revolutions per second. In order to attain this speed and to provide smooth rotation at such a speed, the shaft of the rotor must be mounted on bearings that have only a very small frictional loss and yet provide a stable support.

A gas-lubricated thrust bearing comprising a member rotatable with a rotor shaft and a cooperating non-rotatable member has proven to be satisfactory from the standpoint of low frictional loss, but such bearings used in the past were unstable at critical frequencies when the shaft was vibrating. Also, the previously known gas bearings had inherent sealing problems because the non-rotatable bearing member used was shaped to provide an inverted conical space, with the revolving shaft of the rotor passing through the apex of the cone. The compressed gas, which was the thrust bearing lubricant, flowed upwardly around the shaft and completely filled the conical space between the bearing members and the shaft. This necessitated some type of gland, usually an oil gland, that surrounded the shaft immediately below the conical bearing member, in order to prevent the escape of the compressed gas along the shaft. As this oil gland was exposed to the full pressure of the gas supporting the bearing, the oil in the gland had to be maintained at a higher pressure than the gas pressure. This high oil pressure resulted in an undesirably large flow of lubricating oil.

Accordingly, one object of this invention is to provide a fluid pressure thrust bearing of improved stability.

An additional object of the invention is to provide a fluid pressure thrust bearing that will function efficiently on a vibrating shaft.

A further object of the present invention is to provide a fluid pressure thrust bearing that will support a heavy load without the necessity of high fluid pressure in the space adjacent said shaft.

A still further and specific object of this invention is to provide in combination with a rotatable shaft an arrangement of a gas thrust bearing and an air-tight fluid gland such that the gas pressure in the bearing may be high while the fluid pressure in the fluid gland is at a much lower value.

It is also a specific object of this invention to provide a fluid thrust bearing in which the pressure fluid is supplied through a non-rotatable part of the bearing that is resiliently mounted for movement responsive to that of an adjacent rotatable part of the bearing.

The invention will be specifically described as a gas pressure bearing for supporting the rotor shaft of a centrifuge. However, it will be understood that a bearing made in accordance with the principles of this invention can be usefully employed with devices other than centrifuges.

Figure 2:
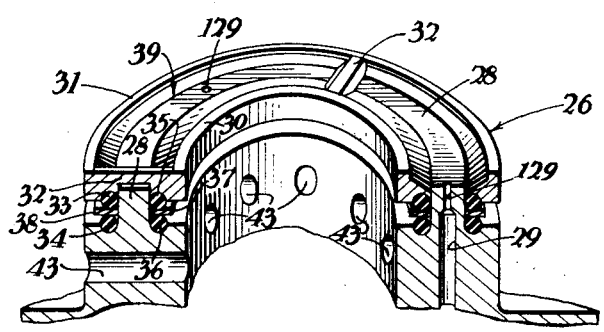

The preceding and other objects of the invention will be apparent from the following detailed description of a preferred embodiment of the invention taken in connection with the accompanying drawings, in which:

Fig. 1 is a partial vertical section of a centrifuge supported by a gas bearing and having a fluid gland; and Fig. 2 is a fragmentary perspective view, partly in section, of non-rotatable parts of the gas bearing.

As is shown in Fig. 1, a centrifuge rotor 21 is secured to a shaft 22 and adapted to rotate therewith inside of a gas-tight casing 23. The rotor 21 and the shaft 22 are entirely supported by a gas thrust bearing 25 comprising a rotatable bearing member or block 24 of disc shape and a relatively stationary, non-rotatable annular collar 26. A key 27, or other suitable means, is used to secure the rotatable bearing block 24 to the shaft 22.

The upper portion of the centrifuge casing 23 is formed into an annular, upstanding or outwardly extending flange 28 in which are drilled a plurality of circumferentially spaced gas passages 29. The flange 28 encircles the shaft 22 and is shown as an integral part of casing 23, but it will be understood that it may be formed separately and affixed by any satisfactory means. Cooperating with and surrounding the stationary flange 28 is the annular collar 26 comprising an inner ring 30 and an outer ring 31 rigidly secured in spaced relationship by a plurality of transverse connecting members in the form of partitions 32, which may be formed integrally with the rings 30 and 31 or welded to them. The annulus or collar 26 fits loosely over, and is free to slide longitudinally on the flange or annulus 28, with ring 30 on the inside, ring 31 on the outside, and partitions 32 crossing over the top of said flange. As shown in Fig. 2, the annular collar 26 rests on, and is supported by, resilient rings 33, 34, 35 and 36, and intervening cooperating washers 37 and 38 in such a way that there is clearance between the top surface of flange 28 and the bottom surfaces of partitions 32. One pair of elastic rings, 33 and 35, which may be made of rubber, neoprene or other suitable material, are retained in grooves cut in the lower surface of annular collar 26. The similar pair of elastic rings 34 and 36 are retained in grooves cut in the upper surface of casing 23, so that ring 34 surrounds the outer periphery of flange 28 while ring 36 is held close to the inner periphery thereof. The washers 37 and 38, formed of metal or fiber, separate the rings that are mounted on the collar 26 from the rings that are mounted on the casing 23. Since the collar 26 is supported entirely by the rings 33, 34, 35 and 36 and the cooperating washers, it may move up and down as well as tilt slightly, such movement being made possible by the elasticity of the rings. This capacity for movement of the annular collar 26 makes it possible to provide a stable bearing surface even though the shaft 22 may be passing through a period of vibration that may cause the rotatable bearing block 24 to tilt in relation to the centrifuge casing 23. As the bearing block 24 tilts, the added pressure on one side of the supporting collar 26 causes the collar to tilt in the same direction so that the bearing block 24 and the supporting collar 26 continue to be maintained separate by the lubricating gas. Besides supporting the annular member or collar 26 against movement away from the block 24, the elastic rings 33, 34, 35 and 36 in cooperation with the fiber washers 37 and 38 perform an additional function in sealing the spaces between the inner end of the collar member 26 and the annular flange 28 so that gas cannot leak between the rings of the collar and the upstanding flange of these non-rotatable annular means.

The upper surfaces of rings 30 and 31 are inclined from the center to the inner and outer peripheries, respectively, of the collar 26 so that an annular recess 39 is formed by the upper surfaces of ring 30, annular flange 28, and ring 31. The recess 39 is divided by partitions 32 into a plurality of compartments that taper from a narrow bottom to a wide top, as shown. Three compartments are shown in the present illustrative disclosure, but the number may vary with the size of the bearing.

Each of the plurality of passages 29 formed in the flange 28 has its upper end shaped to provide a jet or nozzle 129 for introducing gas under pressure at a point between the rotatable bearing member 24 and the non-rotatable annular collar 26. One or more jets 129 open into each compartment of recess 39.

The supporting gas is fed to the bearing through a laterally extending passage 40 that connects with a gas distribution chamber or manifold 41 of large capacity compared to the capacity of conduits 29 and the annular recess or trough 39. For this reason substantially equal gas pressure is provided at each jet 129 and in each compartment of recess 39. Dividing the recess 39 into compartments thus serves to equalize the pressure on the rotatable bearing block 24.

The bearing gas under a pressure sufficient to support the load flows through passage 40 into distribution chamber 41, and thence through passages 29 and into the annular recess 39, filling the compartments of said recess.

As the gas supports the bearing block 24 slightly above the annular collar 26, a thin film of gas spills over the inner and outer upper edges of the annular collar 26, the gas passing over the outer edge spilling directly into the atmosphere, while the gas passing inwardly enters a capacious central exhaust chamber 42, which is provided with a plurality of relatively large radial openings 43 through which the gas vents to the atmopshere. Because of the large capacity of the openings 43, the gas in the exhaust chamber or space 42 is at approximately atmospheric pressure.

Surrounding the shaft 22 immediately below the exhaust chamber 42 is an oil gland 50. This lubricating gland may be of any conventional type that will seal the centrifuge casing 23 from the supporting gas and the outside atmosphere. The conventional form of gland shown comprises a brass bushing 51 lined with a thin layer of babbitt. The bushing is supported and sealed in centrifuge casing 23 by two vertically spaced elastic rings 52 and 53, which may be made of rubber, neoprene, or other suitable material. An oil groove 54 cut in the outer surface of the bushing 51 communicates with a plurality of radial oil passages 55 in the bushing and an oil passage 56 extending through the centrifuge casing 23, so that oil can be supplied to the space between the shaft 22 and the bearing surface of the bushing 51.

The oil in the bushing 51 is at a slightly higher pressure than the air in exhaust chamber 42. As has been explained, the pressure in exhaust chamber 42 is approximately atmospheric and, therefore, a pressure of about ten pounds per square inch above atmospheric is usually sufficient to seal the casing 23 so that no gas can seep into the casing around the shaft 22. It will thus be seen that the oil pressure and also the oil flow with such an arrangement will be many times less than the pressure and flow in an oil gland that is exposed to, and must seal against, the full pressure of the supporting gas in the gas thrust bearing, as was required hitherto.

In operation, the centrifuge 21 and its shaft 22 are supported for rotation by the gas thrust bearing 25, which comprises the bearing block 24 keyed to the shaft and the non-rotatable assembly associated with the casing 23 and having the annular recess 39 confronting the bearing block 24. Any tilting or other movement of the bearing block 24 toward the casing 23, due to vibration of the shaft 23, is accommodated by resilient yielding of the rings 33, 34, 35 and 36 interposed between the collar 26 and the casing flange 28. Gas under suitable pressure is continuously supplied to the annular recess 39 through the groove or split in the collar 26, and escapes from the bearing over the peripheral edges of the collar. The gas that is discharged inwardly into the confined annular space surrounding the shaft 22 would exert a considerable pressure on the oil gland 50 but for the fact that the plurality of sizeable passages 43 connecting the annular space with the atmosphere around the casing 23 freely vent the gas as it is discharged. In this way the use in gland 50 of large amounts of lubricating oil under high pressure, and the possibility of gas leakage into the casing 23 are avoided.

It is also to be observed that a thrust bearing embodying the novel principles set forth herein provides a simple efficient construction that is stable at high rotational speeds and has low frictional losses. In addition, the use of a compartmented annular ring and spaced, air pressure supply jets affords a support wherein the gas pressure is substantially constant around the entire bearing surface.

It appears obvious that many variations and changes in the details of construction and arrangement of parts will readily suggest themselves to persons skilled in the art and still fall within the spirit and scope of the invention. Therefore, the present disclosure is meant to be merely illustrative, and the invention is to be limited only by the scope of the appended claims.

I claim:

1. A gas-lubricated bearing for sustaining the axial thrust on a shaft including a bearing block member adapted to be secured to said shaft for rotation therewith; a stationary first annulus constructed and arranged to encircle said shaft, said first annulus being provided with a flange extending longitudinally of said shaft; and a second annulus constructed and arranged for longitudinal and tilting movements with respect to the flange of said first annulus, said second annulus comprising two concentric rings and means for maintaining said rings in spaced relation on opposite sides of said flange, and said flange and said rings together defining an annular trough confronting said bearing block member.

2. In combination with a shaft, a fluid thrust bearing comprising a rotatable bearing member secured to said shaft; a stationary first annulus cooperating with said rotatable member; and a second annulus adapted to move longitudinally with respect to the first annulus and including two concentric rings secured in spaced relationship and mounted with the inner ring inside and the outer ring outside the stationary annulus, said first and second annuli being formed and arranged to provide a passage for introducing gas under pressure to the bearing and a communicating annular gas recess confronting the rotatable bearing member.

3. In combination with a vertical shaft, a gas thrust bearing comprising a rotatable bearing member secured to said shaft; a stationary first annulus encircling the shaft and cooperating with the rotatable bearing member; and a second annulus formed of two concentric rings and a series of transverse connecting members maintaining said rings in spaced relationship, the second annulus being mounted on the stationary first annulus for vertical movement with the inner ring inside and the outer ring outside the stationary first annulus, the upper surfaces of the two annuli being formed to provide an annular recess divided into compartments by the series of transverse connecting members, and the stationary first annulus member having passage means freely connecting the space surrounding the shaft with the atmosphere whereby the gas pressure at the inner periphery of the first annulus member is approximately that of the atmosphere.

4. A fluid thrust bearing comprising a rotatable bearing block adapted to be secured to a shaft; a stationary first annulus cooperating with the rotatable bearing block; and a second annulus mounted for longitudinal sliding movement on the stationary first annulus and providing with said first annulus an annular recess adjacent the rotatable bearing block, the stationary first annulus being formed to provide a circular, fluid pressure manifold, a plurality of circumferentially spaced fluid jets leading from the manifold to the said annular recess, and a plurality of passages extending between its inner and outer peripheries to connect the central space to the atmosphere.

5. A gas thrust bearing comprising a bearing block adapted to be secured to a rotatable shaft; non-rotatable annular means adapted to encircle the shaft and abut the bearing block; and a lubricating gland for the shaft arranged to provide with the bearing block and the annular means an annular chamber about the shaft, said annular means including separate passages for supplying gas under pressure to the space between the abutting surfaces of the bearing block and the annular means and to permit the ready escape of the gas under pressure that spills into the annular chamber.

6. A gas thrust bearing for a centrifuge or the like having a vertical shaft, a rotor mounted on the shaft and a stationary, gas-tight casing enclosing the rotor, comprising, in combination, a rotatable bearing block secured to the shaft above the casing; and a lubricating gland in communication with an external source of lubricant and surrounding the shaft where it enters the casing, the casing including an upstanding annular means encircling the shaft in spaced relation thereto and above the lubricating gland, the annular means being formed and arranged to provide an annular recess confronting the bearing block, a passage for supplying gas under pressure to said annular recess, and a passage connecting the confined space surrounding the shaft above the lubricating gland with the atmosphere, whereby gas under pressure entering that space will be freely dissipated and prevented from entering the casing through the lubricating gland.

7. In combination, a rotor; a gas-tight casing enclosing said rotor; a shaft supporting said rotor and passing through said casing; a lubricating gland mounted on said casing and surrounding said shaft; a bearing block secured to said shaft for rotation therewith, said casing being formed to provide an annular upstanding flange encircling said shaft above said lubricating gland; an annular member surrounding said flange and adapted to move longitudinally thereon in cooperation with said bearing block; and resilient means for supporting said annular member against movement away from said bearing block, said casing and said annular member being formed and arranged to provide passage means for introducing gas under pressure between said bearing block and said annular member, an exhaust chamber surrounding said shaft adjacent said lubricating gland into which gas may spill inwardly from between said bearing block and said annular member, and additional passage means for the free escape of gas from said exhaust chamber to without said casing.

8. In combination, a rotor; a gas-tight casing enclosing said rotor; a shaft supporting said rotor and passing through said casing; a lubricating gland mounted on said casing and surrounding said shaft; a bearing block secured to said shaft for rotation therewith, said casing being formed to provide an annular upstanding flange encircling said shaft above said lubricating gland; an annular member surrounding said flange and adapted to move longitudinally thereon in cooperation with said bearing block, said annular member being shaped to form with said upstanding flange a trough-shaped recess confronting said bearing block; and resilient ring means for supporting said annular member against movement away from said bearing block, said casing and said annular member being formed and arranged to provide passage means for introducing gas under pressure between said bearing block and said annular member, an exhaust chamber surrounding said shaft adjacent said lubricating gland into which gas may spill inwardly from said trough-shaped recess between said bearing block and siad annular member, and additional passage means for the free escape of gas from said exhaust chamber to without said casing.

9. In a fluid thrust bearing, the combination comprising a rotatable bearing block and a cooperating non-rotatable assembly including an upstanding annular flange member, a collar member confronting said bearing block and formed to provide a groove loosely engaging said flange member for vertical movement thereon, a first vertically arranged pair of resilient rings engaging the inner peripheral surface of said flange member, a second vertically arranged pair of resilient rings engaging the outer peripheral surface of said flange member, a first washer separating said first pair of resilient rings and engaging the inner peripheral surface of said flange member, and a second washer separating said second pair of resilient rings and engaging the outer peripheral surface of said flange member, said non-rotatable assembly being provided with a passage for introducing fluid under pressure between said bearing block and said collar member.

10. The combination comprising a gas-tight casing; a rotatable shaft extending into said casing; a lubricant gland sealing said shaft where it enters said casing; and a gas thrust bearing including a member rotatable with said shaft and a cooperating non-rotatable member associated with said casing and surrounding said shaft outside said casing, said casing, lubricant gland, and gas thrust bearing being formed and arranged to define an atmospherically vented exhaust-space, whereby gas under pressure spilling inwardly from said gas thrust bearing is prevented from entering said casing through said lubricant gland.

11. The combination comprising a gas-tight casing; a vertical rotatable shaft extending into said casing; an oil gland sealing said shaft where it enters said casing; and a gas thrust bearing including a disc-shaped member rotatable with said shaft and a cooperating, non-rotatable, upstanding flange member associated with said casing and surrounding said shaft outside said casing, said casing, oil gland and gas thrust bearing being formed and arranged to define an atmospherically vented exhaust space whereby gas under pressure spilling inwardly from said gas thrust bearing is prevented from entering said casing through said oil gland.

12. The combination comprising a gas-tight casing; a rotatable shaft extending into said casing; a sealing gland surrounding said shaft where it enters said casing, said casing being provided with an outwardly extending flange encircling said shaft; a bearing block of disc shape secured to said shaft for rotation therewith; a non-rotatable collar member carried by said flange and adapted to move longitudinally thereof in response to movement of said bearing block, the flange of said casing being formed to provide a passage for introducing gas under pressure between said bearing block and said collar; and resilient means supporting and sealing the inner end of said collar member adjacent said flange.

13. The combination comprising a gas-tight casing; a rotatable shaft extending into said casing; a sealing gland surrounding said shaft where it enters said casing, said casing being provided with an outwardly extending flange encircling said shaft; a bearing block of disc shape secured to said shaft for rotation therewith; a non-rotatable collar member carried by said flange and adapted to move longitudinally thereof in response to movement of said bearing block, the flange of said casing being formed to provide a passage for introducing gas under pressure between said bearing block and said collar; and resilient means supporting and sealing the inner end of said collar member adjacent said flange, said casing, sealing gland, bearing block and collar member being constructed and arranged to define an atmospherically vented exhaust space about said shaft.

References Cited in the file of this patent

UNITED STATES PATENTS

| | | |
|---|---|---|
| 611,984 | Wright | Oct. 4, 1898 |
| 1,436,265 | Kingsbury | Nov. 21, 1922 |
| 1,906,715 | Penick | May 2, 1933 |